United States Patent
Saito

(10) Patent No.: US 10,684,454 B2
(45) Date of Patent: Jun. 16, 2020

(54) MARKER SUPPRESSING ABERRATION

(71) Applicant: Enplas Corporation, Saitama (JP)

(72) Inventor: Tomohiro Saito, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/060,426

(22) PCT Filed: Dec. 2, 2016

(86) PCT No.: PCT/JP2016/085847
§ 371 (c)(1),
(2) Date: Jun. 8, 2018

(87) PCT Pub. No.: WO2017/099007
PCT Pub. Date: Jun. 15, 2017

(65) Prior Publication Data
US 2018/0364459 A1  Dec. 20, 2018

(30) Foreign Application Priority Data
Dec. 8, 2015 (JP) ................. 2015-239184

(51) Int. Cl.
G02B 13/18 (2006.01)
G02B 3/00 (2006.01)
G02B 27/18 (2006.01)
G02B 3/02 (2006.01)
G09F 19/12 (2006.01)
(Continued)

(52) U.S. Cl.
CPC ........... *G02B 13/18* (2013.01); *G02B 3/0006* (2013.01); *G02B 3/02* (2013.01); *G02B 27/18* (2013.01);
(Continued)

(58) Field of Classification Search
CPC ...... G02B 13/0045; G02B 9/64; G02B 13/18; G02B 27/0025; G02B 13/04; G02B 3/04;
(Continued)

(56) References Cited

U.S. PATENT DOCUMENTS 7,480,100 B1 * 1/2009 Raymond .............. G02B 27/06
359/619
7,731,813 B2 * 6/2010 Raymond .............. G02B 30/27
156/102

(Continued)

FOREIGN PATENT DOCUMENTS

JP 06-082934 A 3/1994
JP 06-289320 A 10/1994
(Continued)

OTHER PUBLICATIONS

International Search Report from International Application No. PCT/2016/085847 dated Feb. 28, 2017.
(Continued)

*Primary Examiner* — William R Alexander
*Assistant Examiner* — Sharrief I Broome
(74) *Attorney, Agent, or Firm* — Brundidge & Stanger, P.C.

(57) ABSTRACT

A marker (10) includes a lenticular lens (11) formed from a translucent material to have a plurality of convex portions (13) positioned to line up in, for example, at least one direction. The optical axes (OA1) of the convex portions (13) all intersect with an optical reference point (OP) on the product optical axis (PA). The optical axes (OA1) of the convex portions (13) are all orthogonal with and pass through the center of the bottom surfaces of grooves (14). Colored portions (15) are accommodated in the grooves (14).

4 Claims, 9 Drawing Sheets

(51) Int. Cl.
  *G02B 27/60* (2006.01)
  *G02B 27/00* (2006.01)
  *G02B 27/32* (2006.01)
  *G03B 35/24* (2006.01)

(52) U.S. Cl.
  CPC .......... *G02B 27/0093* (2013.01); *G02B 27/32* (2013.01); *G02B 27/60* (2013.01); *G03B 35/24* (2013.01); *G09F 19/12* (2013.01)

(58) Field of Classification Search
  CPC ...... G02B 13/16; G02B 13/02; G02B 13/002; G02B 13/22; G02B 13/006; G02B 17/08; G02B 9/60; G02B 5/005; G02B 13/0015; G02B 13/004; G02B 9/62; G02B 13/06; G02B 3/02; G02B 13/0065; G03B 21/28; G03B 21/14; G03B 13/32; G03B 21/147; G03B 37/06; G03B 3/00
  See application file for complete search history.

(56) References Cited

U.S. PATENT DOCUMENTS

| | | | | | |
|---|---|---|---|---|---|
| 7,780,100 | B2* | 8/2010 | Helmig | ................ | B24C 5/04 239/434 |
| 2005/0180006 | A1* | 8/2005 | Mendoza | ............ | G02B 27/2214 359/463 |
| 2010/0231823 | A1* | 9/2010 | Goto | .................... | G02B 3/0006 349/62 |
| 2014/0049828 | A1* | 2/2014 | Iriyama | .................... | G02B 1/11 359/601 |
| 2014/0049829 | A1* | 2/2014 | Yumoto | ............. | G02B 27/2214 359/619 |
| 2014/0111639 | A1 | 4/2014 | Hideyuki et al. | | |
| 2017/0082843 | A1* | 3/2017 | Izawa | .................... | G02B 3/005 |

FOREIGN PATENT DOCUMENTS

| | | |
|---|---|---|
| JP | 08-114871 A | 5/1996 |
| JP | 10-186276 A | 7/1998 |
| JP | 2012-145559 A | 8/2012 |
| JP | 2013-025043 A | 2/2013 |

OTHER PUBLICATIONS

Extended European Search Report dated Jun. 28, 2019 from EP Appln. No. 16872905.1.

* cited by examiner

MARKER SUPPRESSING ABERRATION

TECHNICAL FIELD

The present invention relates to a marker.

BACKGROUND ART

As a marker (which is also called "indicator") in which a pattern is projected onto a convex lens part having a convex surface part, an image indication sheet including a lenticular lens and coloring layers is known. This lenticular lens has a configuration in which a plurality of cylindrical lenses are arranged side by side, and the coloring layers are disposed in respective cylindrical lenses and observed as images of respective cylindrical lenses. With this configuration, a collective pattern is formed by the images. The image indication sheet is suitable for recognizing the position, orientation and the like of objects in the fields of augmented reality (AR) and robotics (see, for example, PTL 1 and PTL 2).

CITATION LIST

Patent Literature

PTL 1
Japanese Patent Application Laid-Open No. 2013-025043
PTL 2
Japanese Patent Application Laid-Open No. 2012-145559

SUMMARY OF INVENTION

Technical Problem

FIG. 1A schematically illustrates a cross section taken along an arrangement direction of cylindrical lens parts of a marker according to a reference example in which coloring layers are arranged as disclosed in the PTL, and FIG. 1B schematically illustrates only an arrangement of the cylindrical lens part in the marker. In the drawings, X indicates one direction in the plane direction of the marker, Y indicates a direction orthogonal to the X direction in the plane direction, and Z indicates a direction orthogonal to the X direction and the Y direction (the thickness direction of the marker). It is to be noted that FIG. 1B illustrates the region of the cylindrical lens part included in the lenticular lens part of FIG. 1A.

As illustrated in FIG. 1 for example, marker 100 includes lenticular lens part 110 made of an optically transparent material, and lenticular lens part 110 includes a plurality of cylindrical lens parts 120 disposed in the plane direction. Cylindrical lens part 120 includes convex surface part 130 on the front surface side, and groove 140, coloring part 150 provided in groove 140 and a rear surface part 160 that can be optically distinguished from coloring part 150 on the rear surface side. Grooves 140 are disposed at respective locations such that straight lines (optical axes OA) radially extending from optical reference point OP of marker 100 intersect the centers of the bottom surfaces of groove 140.

In marker 100, the position and shape of the observed pattern varies depending on the observation position in the X direction. With this configuration, in marker 100, the pattern is set only by the positions of the coloring parts in the direction along the rear surface of the convex lens part.

In marker 100, aberration in the convex lens part becomes greater toward the ends in the X direction. Accordingly, the clearness of the image projected on the convex surface part decreases toward the ends in the X direction. In view of this, the above-mentioned marker has a room for improvement in clearness of the observed pattern.

An object of the present invention is to provide a marker that projects clearer patterns.

Solution to Problem

A marker according to an embodiment of the present invention includes: a multi-lens part made of an optically transparent material and including a plurality of convex surface parts arranged at least in one direction; and a plurality of detection object parts corresponding to the plurality of the convex surface parts and configured to be projected onto the plurality of the convex surface parts as optically detectable images. When, in a cross section taken along an arrangement direction of the plurality of the convex surface parts, a straight line orthogonal to an imaging surface of one of the plurality of the detection object parts on a side of the plurality of the convex surface parts is set as an optical axis of one of the plurality of the convex surface parts corresponding to the one of the plurality of the detection object parts, the imaging surface being formed with the multi-lens part, and a straight line which is perpendicular to the arrangement direction and passes through an intersection of optical axes of two convex surface parts disposed at both ends of the plurality of the convex surface parts is set as an optical axis of the multi-lens part, each of optical axes of the plurality of the convex surface parts crosses the optical axis of the multi-lens part at a position on the side of the plurality of the convex surface parts relative to the plurality of the detection object parts, and the plurality of the detection object parts include a second detection object part that is disposed at a position where an intersection of an optical axis of one of the plurality of the convex surface parts corresponding to the second detection object part and the imaging surface of the second detection object part is a focal point of the one of the plurality of the convex surface parts corresponding to the second detection object part.

Advantageous Effects of Invention

The marker according to the embodiments of present invention suppresses aberration and influences of aberration, and thus can project clearer patterns in comparison with a marker in which the pattern is set only by positions of coloring parts in the direction along the rear surface of a convex lens part.

DESCRIPTION OF EMBODIMENTS

First Embodiment

Figure 1A:
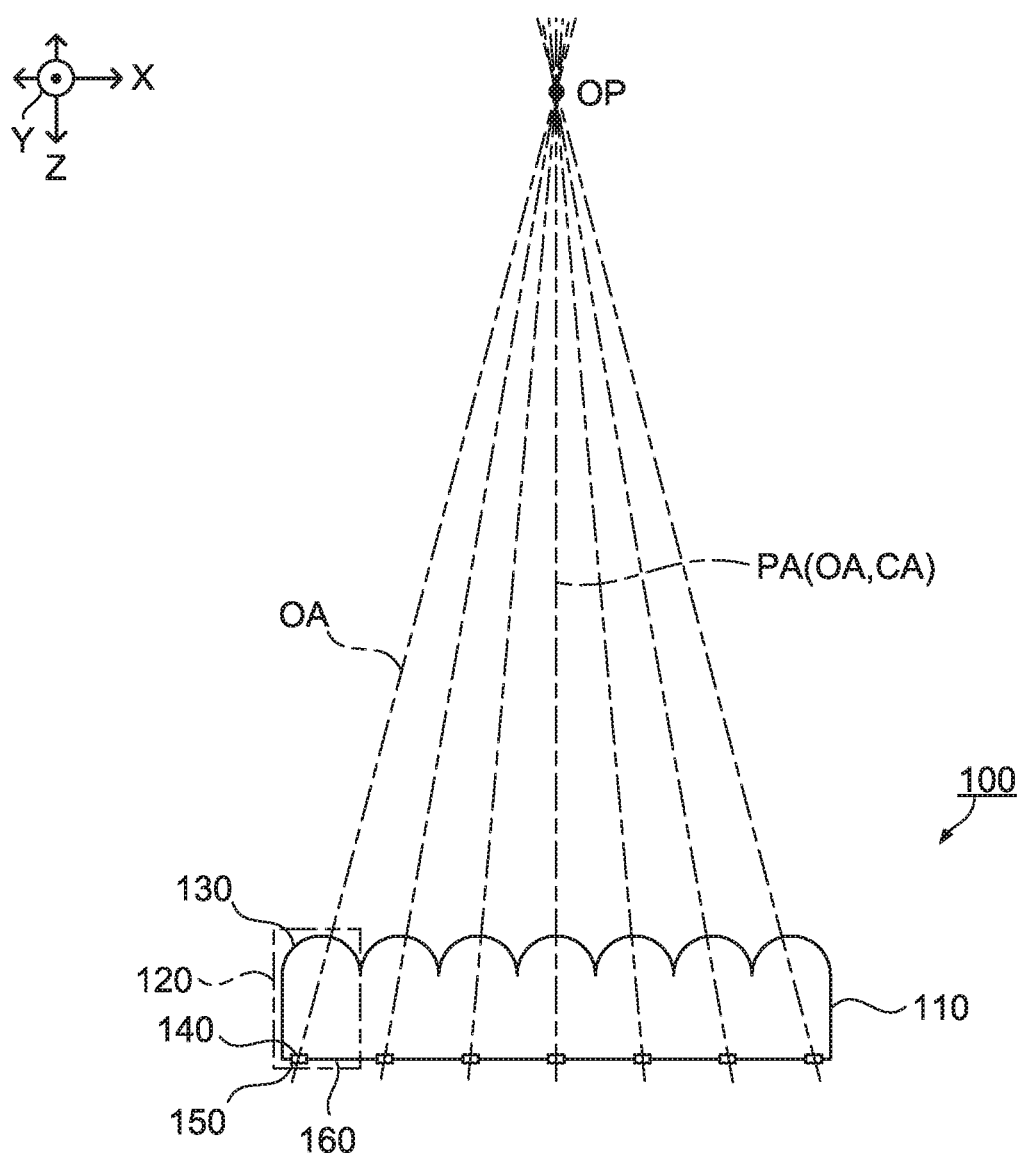
FIG. 1A schematically illustrates a cross section taken along an arrangement direction of cylindrical lens parts of a marker according to an reference example, in which hatching is omitted, and FIG. 1B schematically illustrates only an arrangement of the cylindrical lens parts in the marker.
Figure 1B:
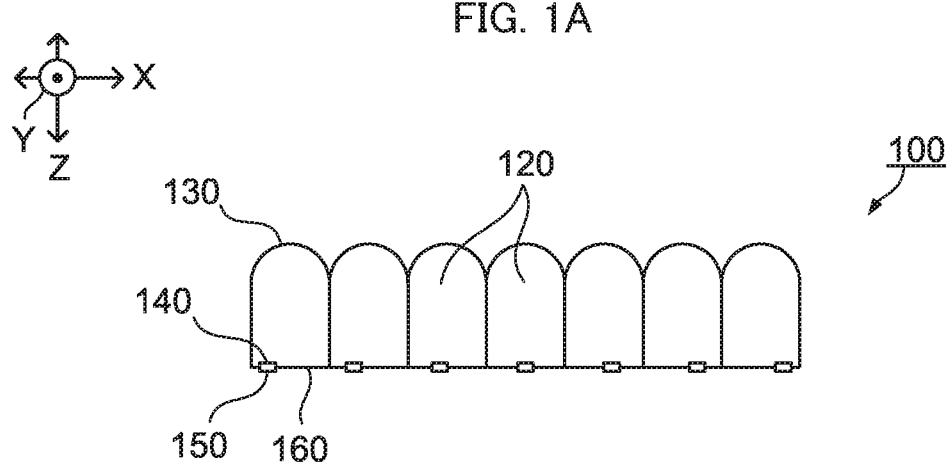
Figure 2A:
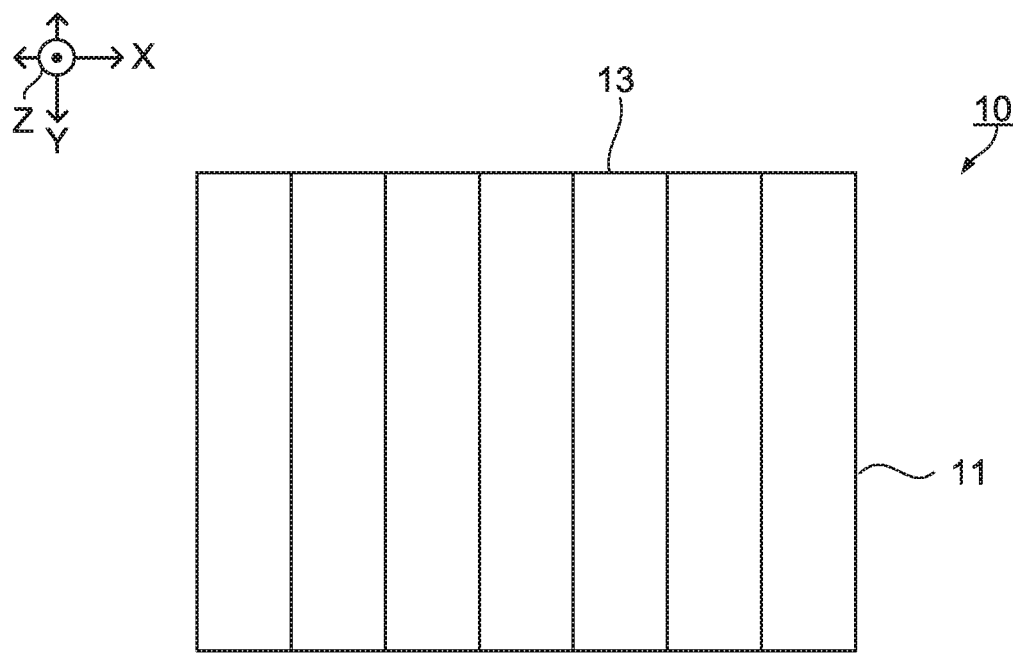
FIG. 2A is a plan view schematically illustrating a marker according to the first embodiment of the present invention.
Figure 2B:
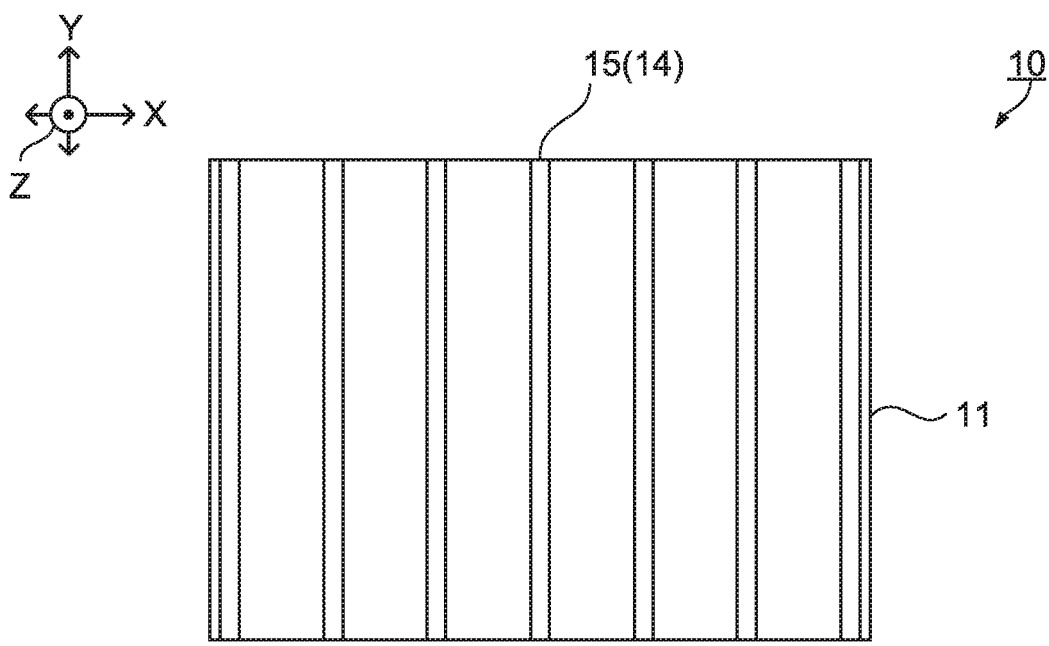
FIG. 2B is a bottom view schematically illustrating the marker.
Figure 3A:
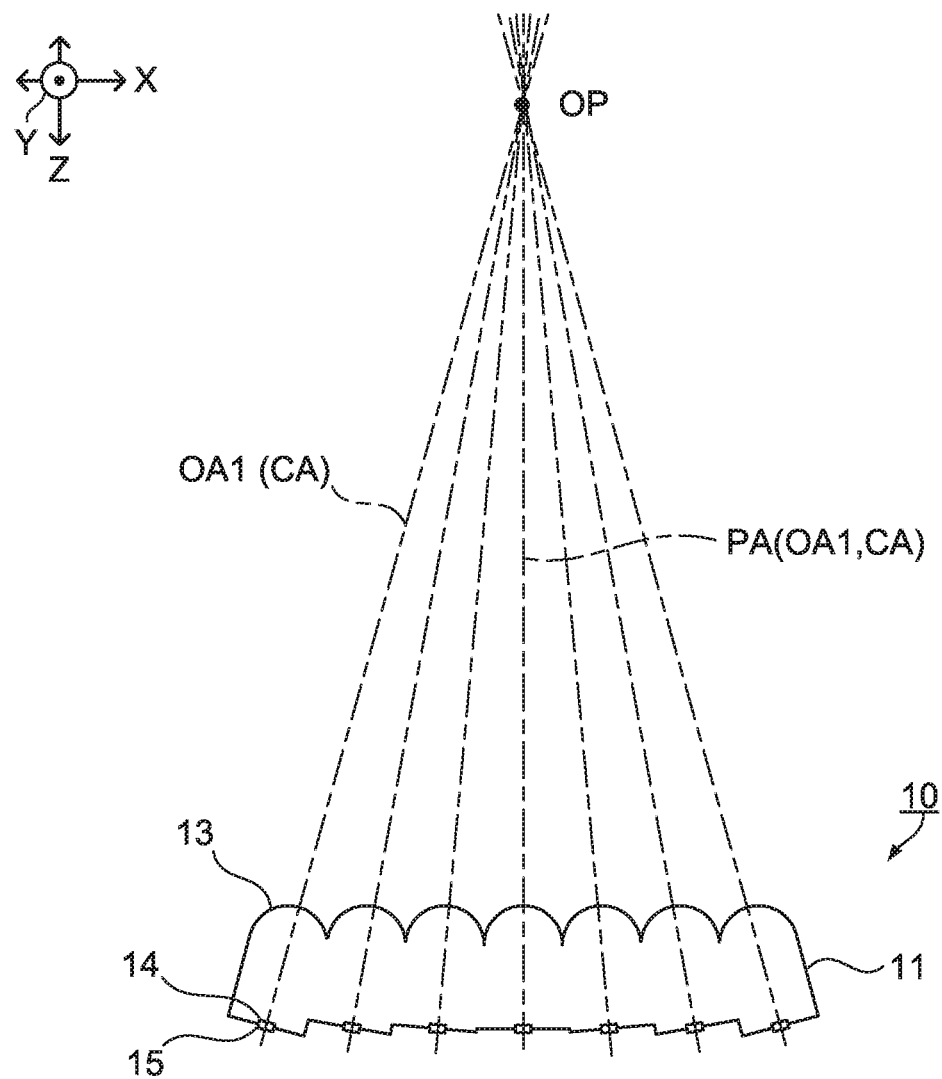
FIG. 3A schematically illustrates a cross section taken along an arrangement direction of convex surface parts of the marker according to the first embodiment of the present invention, in which hatching is omitted, and FIG. 3B schematically illustrates an arrangement of cylindrical lens parts in the marker in which each cylindrical lens part is set as a component unit.
Figure 3B:
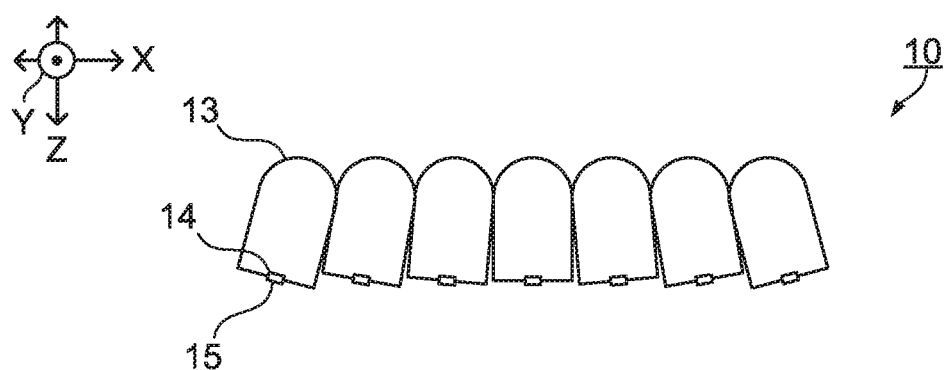

FIG. 2A is a plan view schematically illustrating marker 10 according to the present embodiment, and FIG. 2B is a bottom view schematically illustrating marker 10. FIG. 3A schematically illustrates a cross section of marker 10 taken along the arrangement direction of convex surface parts 13, in which hatching is omit, and FIG. 3B schematically illustrates an arrangement of the cylindrical lens parts in the marker in which each cylindrical lens part is set as a component unit in marker 10.

Marker 10 includes lenticular lens part 11 made of an optically transparent material such as a transparent material. Lenticular lens part 11 is a molded article having a shape obtained by integrating a plurality of cylindrical lenses arranged in the X direction, and has, for example, a shape obtained by integrating a plurality of cylindrical lenses arranged as illustrated in the drawings in which gaps between each cylindrical lens are filled with a transparent material. Lenticular lens part 11 corresponds to a multi-lens part.

Lenticular lens part 11 has a rectangular planar shape with the long side along the X direction and the short side along the Y direction, for example. Examples of the optically transparent material of lenticular lens part 11 include transparent resins such as polycarbonate and acrylic resin, and transparent inorganic materials such as glass. Preferably, in view of mass production, the optically transparent material is an optically transparent resin, and lenticular lens part 11 is an injection-molded article of such a resin.

Lenticular lens part 11 includes a plurality of convex surface parts 13 disposed side by side in the X direction. Each convex surface part 13 has a rectangular planar shape with the long side along the Y direction and the short side along the X direction. Convex surface parts 13 have planar shapes of the same size with a width (the length in the X direction) of 370 μm and a length (the length in the Y direction) of 3 mm, for example. The pitch is the center-to-center distance between detection object parts next to each other in the X direction.

In the cross section of lenticular lens part 11 taken along the XZ plane, the shape of convex surface part 13 is a semicircle or a non-semicircle, for example. The non-semicircle is a convex curve other than a semicircle, and is, for example, a curve composed of arcs having different curvature radiuses. Preferably, the non-semicircle is a curve whose curvature radius increases as the distance from the center of convex surface part 13 increases in the above-mentioned cross section. At its apex, convex surface part 13 includes a ridgeline along the Y direction.

A plurality of grooves 14 are formed on the rear surface of lenticular lens part 11. Grooves 14 correspond to convex surface parts 13. Groove 14 has a slender rectangular planar shape with the long side along the Y direction, and has a rectangular cross-sectional shape in the XZ plane. Preferably, the depth of groove 14 (the distance between the bottom surface of groove 14 and the above-mentioned rear surface) is 10 to 100 μm.

When a straight line that is orthogonal to the bottom surface of groove 14 and intersects the center of the bottom surface in the XZ plane is set as optical axis OA1 of each convex surface part 13, grooves 14 are formed in respective orientations such that optical axes OA1 corresponding to respective grooves 14 cross each other at optical reference point OP. In this manner, grooves 14 are formed in respective orientations such that optical axes OA1 cross each other on convex surface part 13 side relative to grooves 14.

Here, optical reference point OP is a point on product optical axis PA. Product optical axis PA, which corresponds to the optical axis of the multi-lens part and is the optical center of marker 10, can serve as a reference in designing of marker 10. Product optical axis PA is represented by a straight line, which is orthogonal to the arrangement direction of convex surface parts 13 (e.g. the X direction) and passes through the crossing point of optical axes OA1 of convex surface parts 13 disposed at both ends in the arrangement direction. Product optical axis PA of marker 10 coincides with optical axis OA1 of convex surface part 13 disposed at the center in the X direction.

In addition, each groove 14 is disposed at a position where the intersection of optical axis OA1 and the bottom surface is the focal point of the corresponding convex surface parts 13. Here, the focal point of convex surface part 13 is a point where light, which travels in parallel with optical axis OA1 of the convex surface part 13 and is incident on the convex surface part 13, substantially crosses the optical axis OA1 after refracted at the convex surface part 13. For example, the focal point of convex surface part 13 is a position where the cross-sectional area of the light flux of the crossing light beams condensed at the bottom surface of groove 14 is minimized.

Further, optical axis OA1 of each convex surface part 13 coincides with optical axis OA1 of convex surface part 13 that coincides with central axis CA of convex surface part 13. Here, central axis CA of convex surface part 13 is a normal of the convex surface part 13 passing through the center of a (rectangular) shape enclosed by the edge of the convex surface part 13, and is represented by a straight line that, in the XZ plane, passes through the middle point of a straight line connecting the both ends of the convex surface part 13 and is orthogonal to the connecting straight line, for example.

Groove 14 is provided with coloring part 15. Coloring part 15 is a colored composition, and is a solidified coating material containing a colorant such as black pigment, for example. The coating material has fluidity, and is a liquid composition or powder. The method of application and solidification of the coating material may be appropriately selected from publicly known methods in accordance with the coating material. Examples of the application method of the coating material include spray coating and screen printing. Examples of the solidification method of the coating material include drying of a liquid coating material, curing of a curable composition (such as radical polymerizable compound) in the coating material, and baking of powder.

Here, groove 14 and coloring part 15 correspond to a detection object part. In addition, the bottom surface of groove 14 corresponds to the imaging surface of the detection object part on convex surface part 13 side, which is formed with lenticular lens part 11.

As is clear from the above description, when each cylindrical lens part in which a detection object part is disposed on central axis CA of convex surface part 13 is set as a single component unit as illustrated in FIG. 3B, marker 10 has a structure that is practically identical to an assembled structure in which convex surface part 13 of each cylindrical lens part is oriented toward optical reference point OP.

It is to be noted that the rear surface of lenticular lens part 11 may be smooth or may have an appropriate surface roughness. The roughening of the rear surface can be performed by a common roughening process such as a blast process, and preferably, the surface roughness is 1 to 10 μm in arithmetic average roughness Ra, for example.

In marker 10, images of coloring parts 15 are projected onto convex surface parts 13 as optically detectable (e.g. black) images, and the images are observed as a collective pattern on the surface of lenticular lens part 11.

Here, "optically detectable" means that the image of coloring part 15 projected on convex surface part 13 is detected based on the optical characteristics. "Optical characteristics" are, for example, the degrees of the color such as brightness, saturation and hue, or the optical intensity such as luminance. The optical characteristics may be appropriately detected in accordance with the use of marker 10, and may be detected by visual confirmation, or by using an optical detection device, for example. In addition, the optical characteristics may be detected directly or may be detected using another device, and an example of the latter case is irradiation using a UV lamp for exciting a composition in the case where coloring part 15 is a transparent composition that emits fluorescence.

With marker 10, the pattern is more clearly observed in comparison with the above-described marker 100.

In marker 100, groove 140 is formed along the flat rear surface of cylindrical lens part 120. Accordingly, in marker 100, the distance between convex surface part 130 and coloring part 150 (the bottom surface of groove 140) along optical axis OA in cylindrical lens part 120 increases as the distance from optical reference point OP in the X direction increases. Consequently, spherical aberration increases and the positional displacement between the focal point of convex surface part 130 and coloring part 150 increases in cylindrical lens part 120 as it comes closer to the edge in the X direction. That is, the clearness of the images of coloring parts 150 that form a pattern to be observed in marker 100 decreases toward the ends in the X direction, and as a result, the clearness of the pattern that is observed in marker 100 is low at its end portions in the X direction.

In contrast, in marker 10, the bottom surface of each groove 14 is located at a position of the focal point of convex surface part 13 in an orientation orthogonal to optical axis OA1. Accordingly, each coloring part 15 faces optical reference point OP, and images of coloring parts 15 that form a pattern to be observed in marker 10 have substantially maximum and identical sizes regardless of the positions in the X direction. Accordingly, the pattern that is observed in marker 10 is clearer than the pattern that is observed in marker 100 regardless of the observation position in the X direction.

As described above, marker 10 includes lenticular lens part 11 made of an optically transparent material and including a plurality of convex surface parts 13 disposed side by side in the X direction, and coloring parts 15 corresponding to convex surface parts 13 and configured to be projected onto respective convex surface parts 13 as optically detectable images. In addition, in the XZ plane, when a straight line orthogonal to the imaging surface on convex surface part 13 side of coloring part 15, which is formed with lenticular lens part 11 (i.e. the bottom surface of groove 14) is set as optical axis OA1 of convex surface part 13 corresponding to coloring part 15, and a line that is perpendicular to the X direction and passes through the intersection (optical reference point OP) of optical axes OA1 of convex surface parts 13 at the both ends in the X direction is set as product optical axis PA, optical axes OA1 of convex surface parts 13 cross product optical axis PA on convex surface part 13 side relative to coloring part 15 (e.g. at optical reference point OP), and each coloring part 15 is disposed at a position where the intersection of optical axis OA1 of convex surface part 13 and the imaging surface is the focal point of convex surface part 13. Accordingly, marker 10 can project a clearer pattern in comparison with conventional marker 100 in which the pattern is set only by the position of the coloring part in the direction along the rear surface of the convex lens part.

In addition, optical axis OA1 of each convex surface part 13 coincides with central axis CA of convex surface part 13. That is, not only in convex surface part 13 whose optical axis OA1 and central axis CA coincide with product optical axis PA, but also in other convex surface parts 13, optical axis OA1 coincides with central axis CA. Such a configuration in which optical axes OA1 of convex surface parts 13 include optical axis OA1 of convex surface part 13 that coincide with central axis CA of the convex surface part 13 makes it possible to optically construct lenticular lens part 11 by setting a cylindrical lens part as a single component unit, and is therefore more effective in view of the ease of design of marker 10.

In addition, the configuration in which lenticular lens part 11 is made of a transparent resin makes it possible to fabricate lenticular lens part 11 by injection molding, and fabricate a large amount of lenticular lens parts 11 in which the positional relationship between convex surface part 13 and groove 14 are precisely controlled, and is therefore more effective in view of mass production of marker 10.

Second Embodiment

Figure 4A:
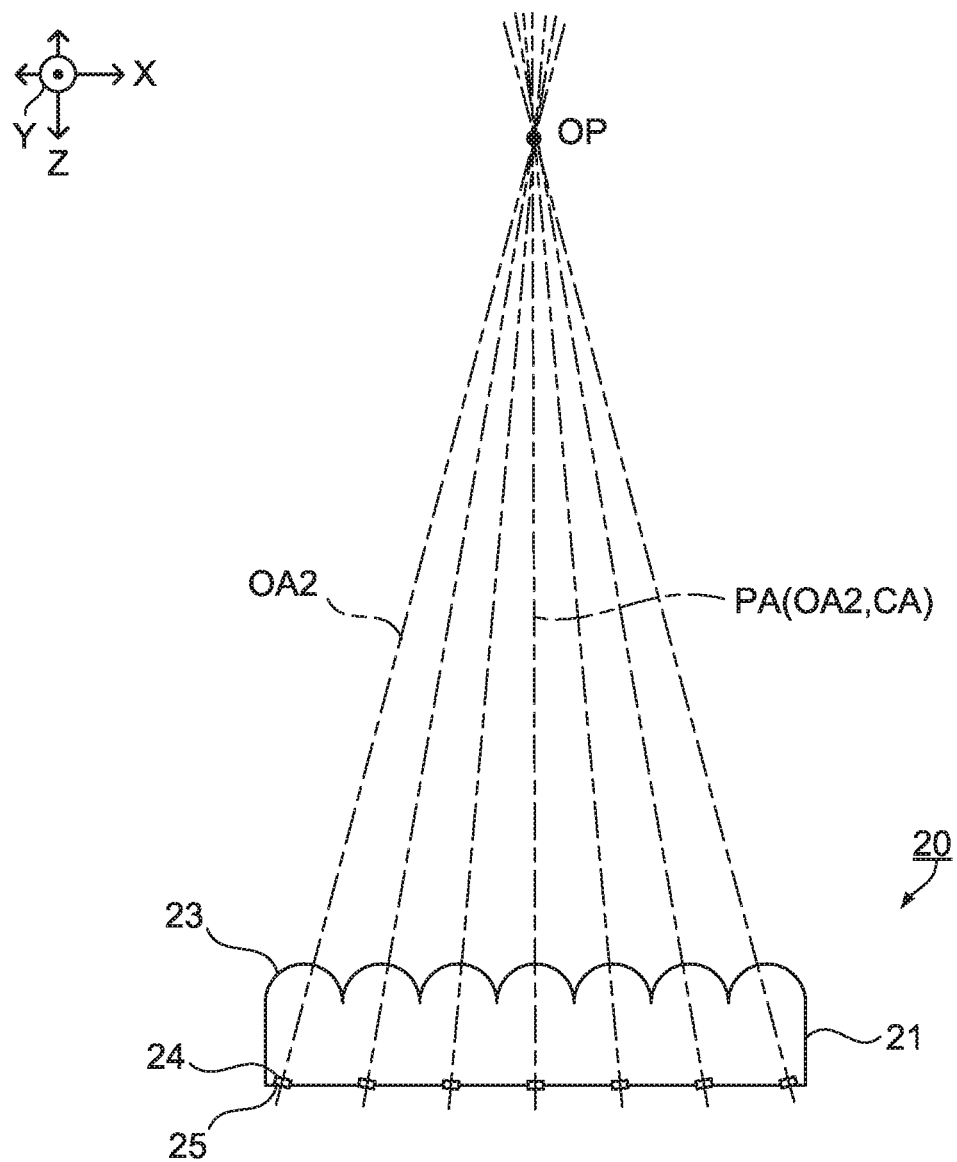
FIG. 4A schematically illustrates a cross section taken along the arrangement direction of convex surface parts of a marker according to the second embodiment of the present invention, in which hatching is omitted, and FIG. 4B schematically illustrates an arrangement of the cylindrical lens parts in the marker in which each cylindrical lens part is set as a component unit in the marker.
Figure 4B:
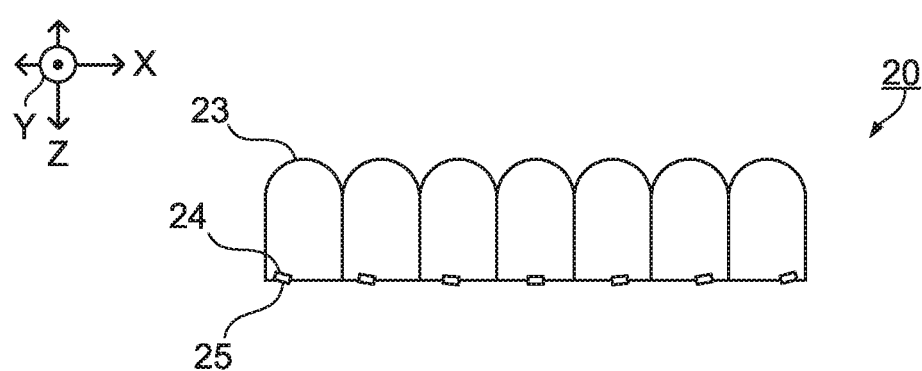

FIG. 4A, in which hatching is omitted, schematically illustrates a cross section of marker 20 taken along an arrangement direction of convex surface parts 23, and FIG. 4B schematically illustrates an arrangement of the cylindrical lens parts of marker 20 in which each cylindrical lens part of marker 20 is set as a component unit.

Marker 20 includes lenticular lens part 21 made of an optically transparent material. Lenticular lens part 21 includes a plurality of convex surface parts 23 made of an optically transparent material and disposed side by side in the X direction. Lenticular lens part 21 is made of a transparent resin for example, and corresponds to a multi-lens part. Lenticular lens part 21 is a molded article having a shape obtained by integrating a plurality of cylindrical lenses arranged in the X direction, and has a lens portion whose structure is substantially identical to a structure in which a plurality of cylindrical lenses directed in the Z direction and arranged along the X direction are integrated as illustrated in FIG. 4B, for example. Accordingly, central axis CA of each convex surface part 23 is represented by a straight line extending along the Z direction.

Marker 20 includes detection object parts corresponding to convex surface parts 23 and configured to be projected onto convex surface parts 23 as optically detectable images. Each detection object part includes groove 24 corresponding to convex surface part 23 in lenticular lens part 21, and coloring layer 25 provided in groove 24.

Groove 24 is formed on the rear surface of lenticular lens part 21. As with marker 10, when, in the XZ plane, a straight line that is orthogonal to the imaging surface (bottom surface) on convex surface part 23 side of groove 24, which is formed with lenticular lens part 21, and intersects the center of the imaging surface is set as optical axis OA2 of convex surface part 23 corresponding to the detection object part, optical axis OA2 of each convex surface part 23 crosses product optical axis PA at a position on convex surface part 23 side relative to the detection object part (optical reference point OP). Product optical axis PA is represented by a straight line that passes through the intersection of optical axes OA2 of convex surface parts 23 disposed at both ends in the X direction and is parallel to the Z direction. Product optical axis PA coincides with optical axis OA2 of convex surface part 23 disposed at the center in the X direction. It is to be noted that central axis CA of convex surface part 23 disposed at the center also coincides with optical axis OA2 of convex surface part 23 disposed at the center.

In addition, each detection object part is disposed at a position where the intersection of optical axis OA2 of convex surface part 23 and the imaging surface is the focal point of convex surface part 23. In the case where the pitch (the center-to-center distance) of convex surface parts 23 is smaller than the pitch (the center-to-center distance) between each detection object part, the focal point of convex surface part 23 (the image surface), in the XZ plane, is located on a convex curve protruding in a direction away from convex surface parts 23 in the Z direction. In the XZ plane, groove 24 is disposed in such a manner as to touch the convex curve at a position of the focal point, which is determined by light incident on corresponding convex surface part 23 from optical reference point OP, outside central axis CA of convex surface part 23 corresponding to groove 24 in the X direction.

The image surface is represented by a convex surface, which is assumed in lenticular lens part 21, having the center at the focal point of convex surface part 23 and protruding in a direction away from convex surface part (the side opposite to convex surface part 23) in the Z direction. The image surface is defined for each optical unit including one convex surface part 23. The optical unit is represented by a region having a substantially quadrangular prism shape including one convex surface part 23 and having a rectangular planar shape. In the present embodiment, the optical unit is configured in a unit identical to the component unit in the cylindrical lens part illustrated in FIG. 4B.

It is to be noted that, in marker 10, the bottom surface of groove 14 is disposed at a position (the position of the focal point) on central axis CA so as to touch the image surface in the XZ plane, and the optical unit thereof is configured in a unit identical to the component unit in the cylindrical lens part illustrated in FIG. 3B.

In optical axes OA2 of a plurality of convex surface parts 23 of marker 20, optical axes OA2 of convex surface parts 23 other than convex surface part 23 (disposed at the center in the X direction) whose optical axis OA2 and central axis CA coincide with product optical axis PA cross central axes CA of respective convex surface parts 23. In this manner, in marker 20, optical axes OA2 of convex surface parts 23 include an optical axis that crosses central axis CA of the convex surface part 23.

In marker 20, as with marker 10, the bottom surface of each groove 24 is located at a position of the focal point of convex surface part 23 in an orientation orthogonal to optical axis OA2. Accordingly, each coloring part 25 faces optical reference point OP, and therefore the images of coloring parts 25 that form the pattern that is observed in marker 20 have substantially maximum and identical sizes regardless of the positions in the X direction. In view of this, the pattern that is observed in marker 20 is clearer than the pattern that is observed in marker 100 regardless of the observation position in the X direction.

Third Embodiment

Figure 5A:
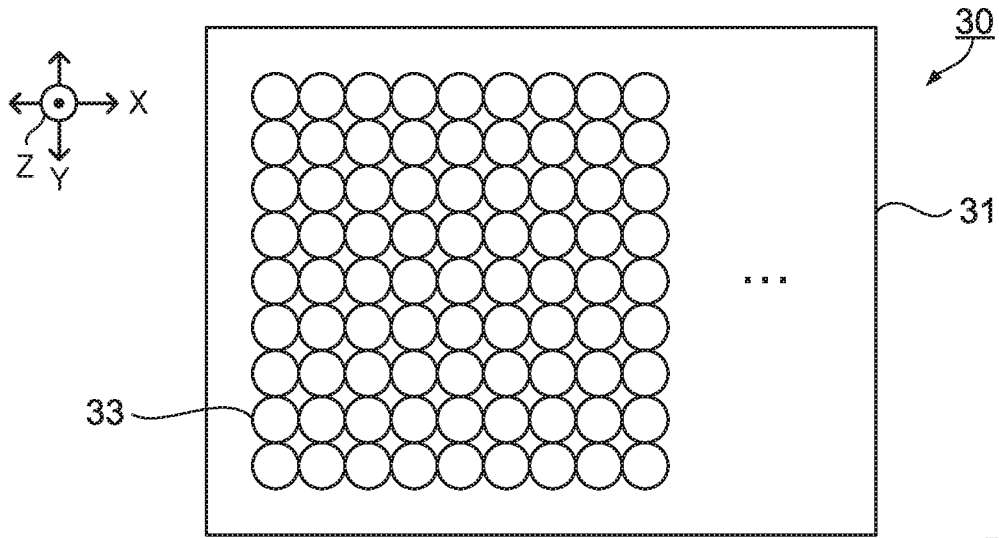
FIG. 5A is a plan view schematically illustrating a marker according to the third embodiment of the present invention.
Figure 5B:
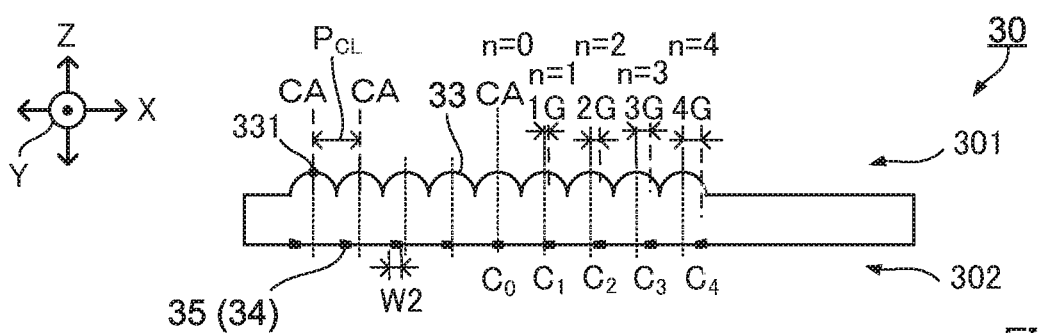
FIG. 5B is a partially enlarged sectional view schematically illustrating a cross section of the marker taken along an arrangement direction of convex surface parts, in which hatching is omitted.
Figure 5C:
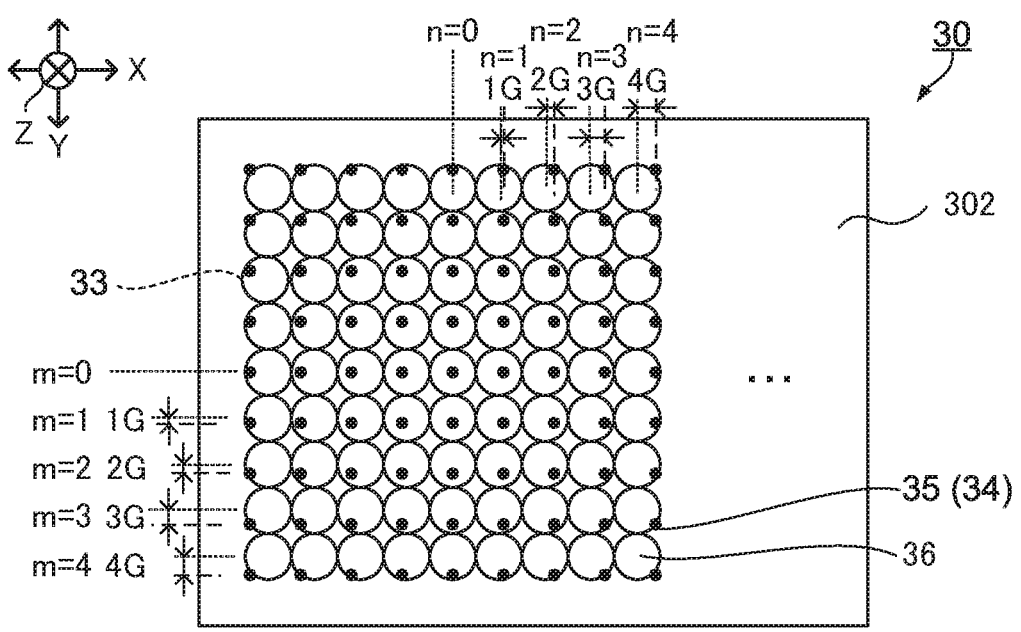
FIG. 5C is a bottom view schematically illustrating the marker.
Figure 6A:
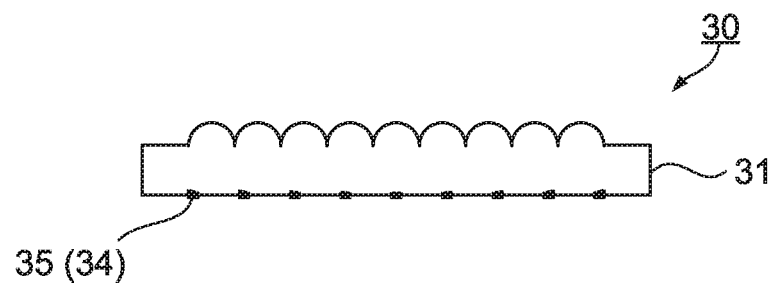
FIG. 6A is a partially enlarged sectional view schematically illustrating a cross section taken along another arrangement direction convex surface parts, in which hatching is omitted, and FIG. 6B schematically illustrates an arrangement of optical axes in an arrangement direction of convex surface parts in the marker.
Figure 6B:
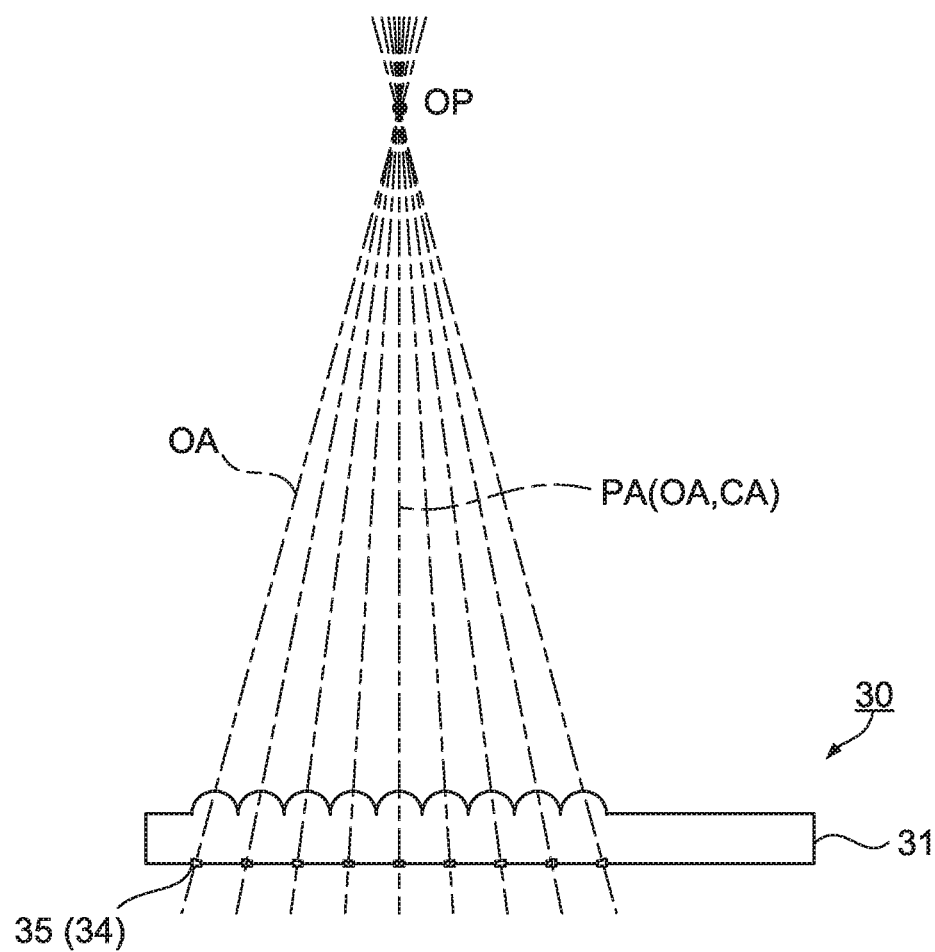

FIG. 5A is a plan view schematically illustrating marker 30, FIG. 5B is a partially enlarged sectional view schematically illustrating a cross section of marker 30 taken along the XZ plane, in which hatching is omitted, and FIG. 5C is a bottom view schematically illustrating marker 30. In addition, FIG. 6A is a partially enlarged sectional view schematically illustrating a cross section of marker 30 taken along the YZ plane, in which hatching is omitted, and FIG. 6B schematically illustrates an arrangement of optical axes OA of marker 30 in the XZ plane.

Marker 30 includes multi-lens part 31 made of an optically transparent material and having a plurality of convex surface parts 33 disposed side by side in the XY direction, and detection object parts that are disposed in respective convex surface parts 33 and configured to be projected onto convex surface parts 33 as optically detectable images. In marker 30, as in the second embodiment, when one convex surface part 33 and a detection object part corresponding to the one convex surface part 33 are set as a single component unit, the convex surface part 33 in the component unit is disposed such that the central axis of the convex surface part 33 extends along the Z direction, while the detection object part is disposed at a position orthogonal to optical axis OA in the component unit, for example.

The optical unit of marker 30 is a region, in the X direction and the Y direction, that is defined by sectioning each convex surface part 33 by a planar shape that is defined by straight lines composed of points whose distance to the center of one convex surface part 33 and distance to the centers of convex surface parts 33 next to the one convex surface part 33 are equal to each other. That is, the optical unit of marker 30 is represented by a region including one convex surface part 33 and having a rectangular (square) planar shape with four straight lines intersecting at right angles at the middle points of straight lines connecting the centers of the one convex surface part 33 and other convex surface parts 33 next to the one convex surface part 33.

Marker 30 includes first surface 301 and second surface 302. First surface 301 includes a plurality of convex surface parts 33. In addition, second surface 302 includes a plurality of detection object parts and reflection parts 36, and each detection object part includes recess 34 and coloring part 35 provided therein. For example, reflection part 36 is portions corresponding to respective convex surface parts 33 in second surface 302, and having planar shapes identical to convex surface parts 33.

The product optical axis of marker 30 is a straight line along in Z direction that passes through the intersection of the optical axes of convex surface parts 33 disposed at both ends in the XZ plane, and passes through the intersection of optical axes of convex surface parts 33 disposed at both ends in the XY plane. In addition, optical axes OA of convex surface parts 33 are straight lines that extend in directions so as to cross the product optical axis at a location on the detection object part side outside marker 30.

Convex surface part 33 has a semicircular cross-sectional shape or a non-semicircular cross-sectional shape. Convex surface part 33 having the semicircular cross-sectional shape forms a spherical lens, and convex surface part 33 having the non-semicircular cross-sectional shape forms an aspherical lens, for example. In a cross section of marker 30 taken along the XZ plane, convex surface part 33 forming an aspherical lens is represented by a curve whose curvature radius increases as a distance from its vertex 331 increases along the X direction. Here, the curvature radius may continuously increase or intermittently increase as the distance from vertex 331 increases.

It is to be noted that, in marker 30, vertex 331 of convex surface part 33 is the intersection of convex surface part 33 and central axis CA. Central axis CA of convex surface part 33 is represented by a straight line that extends along the Z direction and passes through the center of convex surface part 33.

In plan view, convex surface parts 33 have the same size, and each convex surface part has a circular shape, for example. For example, in plan view, the diameter of the shape of convex surface part 33 is 350 μm. The shape of convex surface part 33 is rotationally symmetrical about central axis CA.

Pitch $P_{CL}$ of convex surface parts 33 is 350 μm in the X direction and the Y direction. The "pitch" means the distance ($P_{CL}$) between convex surface parts 33 next to one another. For example, the pitch is the distance between intersections of convex surface part 33 and central axis CA of convex surface parts 33 next to each other in the X direction or the Y direction.

Recess 34 has a substantially columnar shape formed on the rear surface (second surface 302) side of multi-lens part 31. Recess 34 is disposed at a position where the bottom surface thereof intersects the optical axis of convex surface part 33, and the intersection of the bottom surface and the optical axis coincides with the focal point (image surface) of convex surface part 33. Recess 34 is formed on the rear surface side of multi-lens part 31 such that the optical axis of convex surface part 33 intersects the center of the bottom surface at a right angle, for example. In this manner, the focal point of convex surface part 33 is located on the detection object part, and each detection object part is disposed at a position of the focal point of corresponding convex surface part 33.

Figure 7A:
FIG. 7A is a plan view schematically illustrating a first modification of a recess in the marker according to the third embodiment.
Figure 7B:
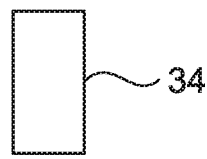
FIG. 7B is a plan view schematically illustrating a second modification of the recess.
Figure 7C:
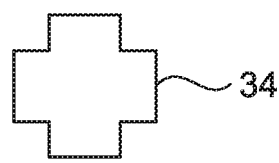
FIG. 7C is a plan view schematically illustrating the second modification of the recess.

Recess 34 has a circular planar shape with a diameter (W2) of 45 μm and a depth of 10 μm. Recess 34 may have other planar shapes. For example, recess 34 may have a square planar shape illustrated in FIG. 7A, a rectangular planar shape illustrated in FIG. 7B, or a cross-like planar shape illustrated in FIG. 7C.

In marker 30, the center-to-center distance ($|Cn-Cn-1|$) between detection object parts next to each other in the X direction is $P_{CL}+nG$ μm, for example, and the center-to-center distance ($|Cm-Cm-1|$) between detection object parts next to each other in the Y direction is $P_{CL}+mG$ μm, for example. The "n" represents an order of a certain convex surface part 33 with respect to 0th convex surface part 33 in the X direction. The "m" represents an order of a certain convex surface part 33 with respect to 0th convex surface part 33 in the Y direction. With this configuration, the center-to-center distances of the detection object parts are greater than the center-to-center distances ($P_{CL}$) of the convex surface parts. That is, in marker 30, in the X direction and the Y direction, the pitch between convex surface parts 33 next to each other is smaller than the center-to-center distance between the detection object parts (recesses 34) next to each other.

Marker 30 may employ only one of the configuration of the first embodiment and the configuration of the second embodiment. That is, in marker 30, recess 34 and coloring part 35 may be disposed in the above-mentioned positional relationship between the convex surface part and the detection object part in the cross section of marker 10 or marker 20 taken along the XZ plane in only one of two directions in the XY plane. For example, when recess 34 and coloring part 35 are located and shaped similarly to the groove and the coloring part of marker 10 in the cross section taken along the XZ plane in one of the X direction and the Y direction, marker 30 can achieve an effect identical to the effect of marker 10 in the one of the X direction and the Y direction.

While convex surface parts 33 protrude in the same direction in the Z direction, and each detection object part is disposed at an appropriate position with respect to corresponding convex surface part 33 in the present embodiment, each component unit including convex surface part 33 and recess 34 whose center is located on central axis CA of the convex surface part 33 in planar shape may be disposed such that the convex surface part 33 (central axis CA) is directed toward optical reference point OP in marker 30, as in the first embodiment. In this case, "central axis CA of convex surface part 33" is represented by a straight line that passes through the middle point of straight line A connecting both ends of convex surface part 33 and is orthogonal to the straight line A in the XZ plane.

In addition, in this case, when the first surface is defined by the rectangular passing through the middle points of straight lines connecting the centers of one convex surface part 33 and convex surface parts 33 next to one convex surface part 33, and the second surface is defined by a rectangular, which include one detection object part corresponding to the convex surface part, around central axis CA corresponding to one detection object part corresponding to the convex surface part, the optical unit is represented by a region of a substantially quadrangular prism including the convex surface part and the corresponding detection object part, and having a shape that is slightly enlarged from the first surface side toward the second surface side.

Fourth Embodiment

Figure 8A:
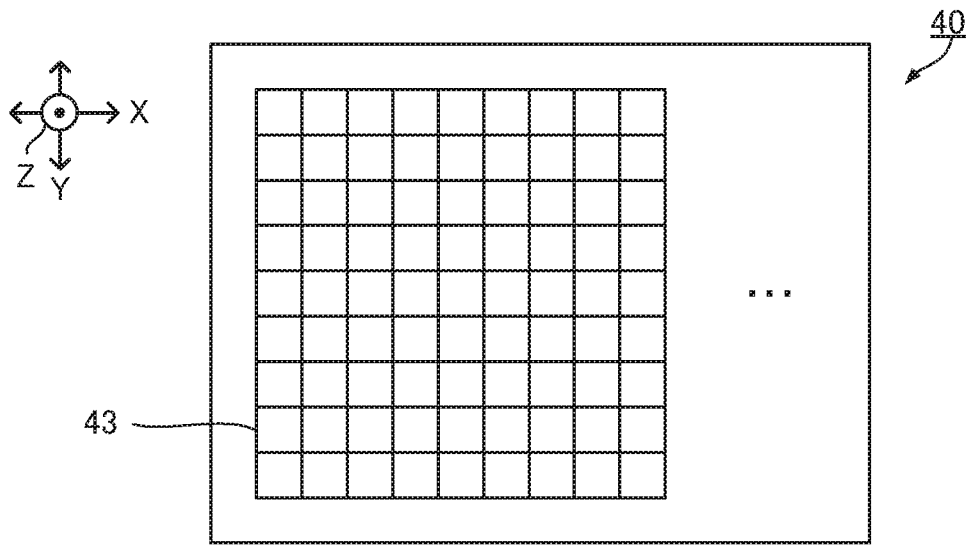
FIG. 8A is a plan view schematically illustrating a marker according to the fourth embodiment of the present invention.
Figure 8B:
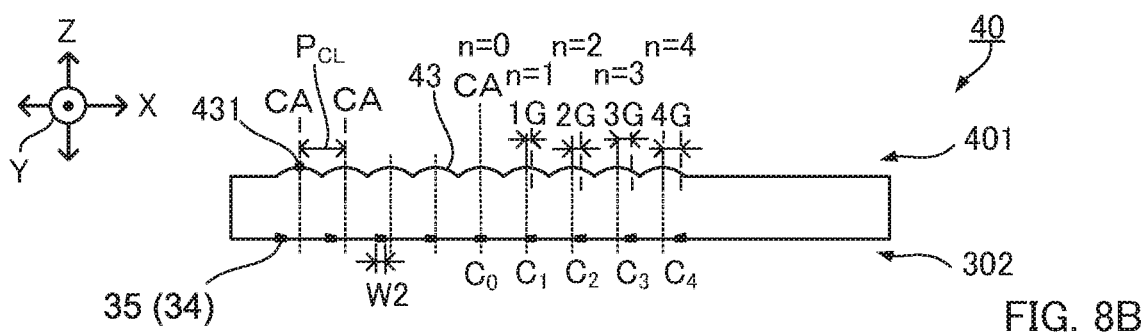
FIG. 8B is a partially enlarged sectional view schematically illustrating a cross section taken along an arrangement direction of convex surface parts in the marker, in which hatching is omitted.
Figure 8C:
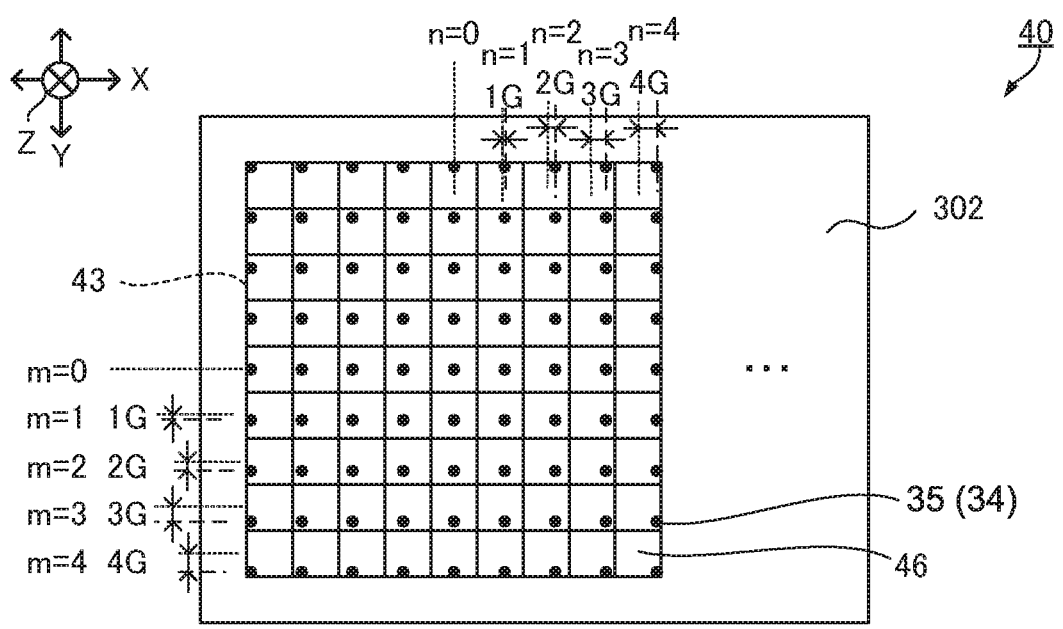
FIG. 8C is a bottom view schematically illustrating the marker.
Figure 9A:
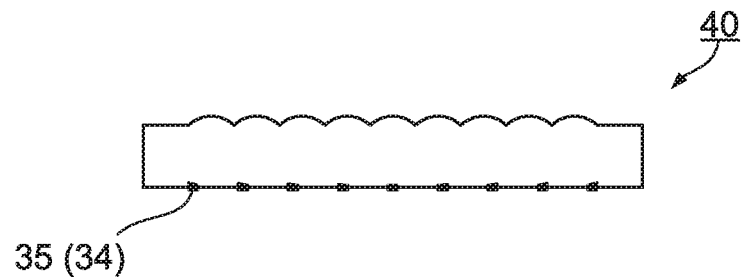
FIG. 9A is a partially enlarged sectional view schematically illustrating a cross section taken along another arrangement direction of the convex surface parts in the marker according to the fourth embodiment, in which hatching is omitted, and FIG. 9B schematically illustrates an arrangement of optical axes in the arrangement direction of the convex surface parts in the marker.
Figure 9B:
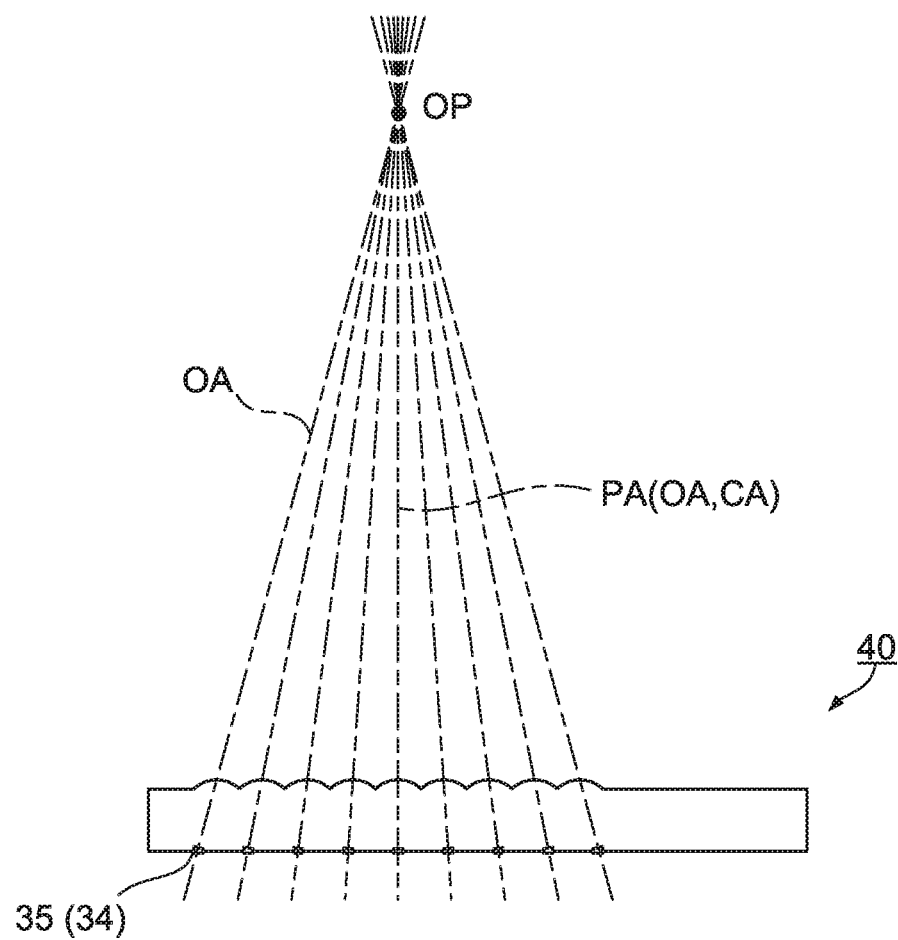

Marker 40 is identical to marker 30 except that the convex surface part and the reflection part have rectangular planar shapes. FIG. 8A is a plan view schematically illustrating marker 40, FIG. 8B is a partially enlarged sectional view schematically illustrating a cross section of marker 40 taken along the XZ plane, in which hatching is omitted, and FIG. 8C is a bottom view schematically illustrating marker 40. In addition, FIG. 9A is a partially enlarged sectional view schematically illustrating a cross section of marker 40 taken along the YZ plane, in which hatching is omitted, and FIG. 9B schematically illustrates an arrangement of optical axes OA of marker 40 in the X direction.

Marker 40 includes first surface 401 and second surface 302. First surface 401 includes a plurality of convex surface parts 43. Each convex surface part 43 has a square shape in plan view, and convex surface parts have the same size. For example, one side of the shape of convex surface part 43 in plan view is 350 µm, and pitch $P_{CL}$ of convex surface parts 43 is 350 µm in the X direction and the Y direction. In addition, reflection part 46 of second surface 302 has a shape identical to the plan shape of convex surface part 43. It is to be noted that reference numeral 431 indicates the vertex of convex surface part 43.

The optical unit of marker 40 is represented by a region having a substantially quadrangular prism shape that is defined by a square (the square of reflection part 46) of convex surface part 43 in plan view, for example.

In marker 40, as with marker 30, in the X direction and the Y direction, the pitch of convex surface parts 43 next to each other is smaller than the center-to-center distance between detection object parts (recesses 34). As with marker 30, marker 40 can achieve an effect identical to the effect of marker 10 in the X direction and/or the Y direction.

Other Embodiments

It should be understood by those skilled in the art that various modifications, combinations, sub-combinations and alterations may occur depending on design requirements and other factors in so far as they are within the scope of the appended claims or the equivalents thereof.

For example, the product optical axis of the marker may not coincide with any of the central axes of a plurality of convex surface parts.

In addition, the optical axes of the convex surface parts need only cross the product optical axis, and the crossing point of the optical axes of the convex surface parts may not be the optical reference point. For example, as long as the desired optical effect is obtained, the optical axes of the convex surface parts in one marker may include one or more group of optical axes of a plurality of convex surface parts whose angles with respect to the product optical axis are identical.

In addition, the optical reference point may not be located on the central axis of the convex lens part, or the cylindrical lens part, disposed at the center. For example, the optical reference point may be located on the central axis of a cylindrical lens part or a convex lens part disposed at an end of in the arrangement direction (e.g. the X direction) of the cylindrical lens parts or the convex lens parts in a marker.

While the detection object part includes a groove and a coloring part in the above-mentioned configuration, the detection object part may have other configurations. For example, the detection object part may include a protrusion and a coloring part, or may composed only of a coloring part such as a colored slender resin housing disposed in a transparent resin molded body. In addition, while the coloring part includes a solidified coating material in the above-mentioned configuration, the coloring part may be a colored sheet.

In addition, the rear surface (the surface opposite to the convex surface parts) of the multi-lens part may be modified as long as the rear surface can be optically recognized with respect to the detection object part. For example, the rear surface may be irregularities formed by minute pyramidal prisms or a reflection surface formed by a metal vapor deposition film, or, may have a color other than those of the above-mentioned coloring parts.

In addition, the multi-lens part may not be an integrally molded article. For example, the marker may include a base material that positions and holds each cylindrical lens part or convex lens part in a desired orientation, and a plurality of cylindrical lens parts or convex lens parts that can be set as a component unit of the multi-lens part.

While each optical axis OA passes through the center of the imaging surface in the detection object part (the groove and the recess) in each embodiment, the optical axis OA may not pass through the center of the imaging surface. For example, each optical axis OA may intersect at any position on the imaging surface as long as optical axis OA is orthogonal to the imaging surface.

In addition, in the first embodiment (marker 10) as in marker 100, the position of the groove may be shifted to the outside from central axis CA of the convex surface part along a direction parallel to the bottom surface of the groove as the distance from product optical axis PA increases in the X direction. For example, in marker 10, when a convex surface part including the product optical axis PA is set as 0th convex surface part, the center of nth groove corresponding to nth convex surface part in the X direction may be shifted away from the central axis of the nth convex surface part by a predetermined distance nGµm (e.g. 0.8 nµm) in the direction parallel to the bottom surface of the groove. In this case, the observation range around the product optical axis of the pattern that is projected onto the surface of the multi-lens part on the convex surface part side can be increased in comparison with marker 10.

This application is entitled to and claims the benefit of Japanese Patent Application No. 2015-239184 dated Dec. 8, 2015, the disclosure of which including the specification, drawings and abstract is incorporated herein by reference in its entirety.

INDUSTRIAL APPLICABILITY

The marker according to the embodiments of the present invention is suitable for recognizing the position, orientation and the like of an object, and is suitable for expanding the effective observation range in all directions or in a specific direction in the above-mentioned uses. Accordingly, the present invention is expected to contribute to development of the technical fields of the above-mentioned uses.

REFERENCE SIGNS LIST 10, 20, 30, 40, 100 Marker
11, 21, 110 Lenticular lens part
13, 23, 33, 43, 130 Convex surface part
14, 24, 140 Groove
15, 25, 35, 150 Coloring part
31 Multi-lens part
34 Recess
36, 46 Reflection part
120 Cylindrical lens part
160 Rear surface part
301, 401 First surface
302 Second surface
331, 431 Vertex
CA Central axis
PA Product optical axis
OA, OA1, OA2 Optical axis
OP Optical reference point

The invention claimed is:

1. A marker, comprising:
   a multi-lens part made of an optically transparent material and including a plurality of convex surface parts arranged at least in one direction along a straight line; and
   a plurality of detection object parts corresponding to the plurality of convex surface parts and configured to be projected onto the plurality of convex surface parts as optically detectable images, wherein:
   when, in a cross section taken along an arrangement direction of the plurality of convex surface parts, a straight line orthogonal to an imaging surface of one of the plurality of the detection object parts on a side of the plurality of the convex surface parts is set as an optical axis of one of the plurality of convex surface parts corresponding to the one of the plurality of the detection object parts, the imaging surface being formed with the multi-lens part, and a straight line which is perpendicular to the arrangement direction and passes through an intersection of optical axes of two convex surface parts disposed at both ends of the plurality of the convex surface parts is set as an optical axis of the multi-lens part,
   each of optical axes of the plurality of the convex surface parts crosses the optical axis of the multi-lens part at a position on the side of the plurality of the convex surface parts relative to the plurality of the detection object parts, and
   the plurality of the detection object parts include a second detection object part that is disposed at a position where an intersection of an optical axis of one of the plurality of the convex surface parts corresponding to the second detection object part and the imaging surface of the second detection object part is a focal point of the one of the plurality of the convex surface parts corresponding to the second detection object part.

2. The marker according to claim 1, wherein the optical axes of the plurality of the convex surface parts include an optical axis of one of the plurality of the convex surface parts that coincides with a central axis of the one of the plurality of the convex surface parts.

3. The marker according to claim 1, wherein the optical axes of the plurality of the convex surface parts include an optical axis of one of the plurality of the convex surface parts that crosses a central axis of the one of the plurality of the convex surface parts.

4. The marker according to claim 1, wherein the multi-lens part is made of a transparent resin.

* * * * *